United States Patent
Bugenhagen et al.

(10) Patent No.: US 10,421,188 B2
(45) Date of Patent: Sep. 24, 2019

(54) ROBOT FINGERPRINT

(71) Applicant: CenturyLink Intellectual Property LLC, Denver, CO (US)

(72) Inventors: Michael K. Bugenhagen, Leawood, KS (US); William R. Walker, Monroe, LA (US); Kevin G. Jones, West Monroe, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 93 days.

(21) Appl. No.: 15/792,551

(22) Filed: Oct. 24, 2017

(65) Prior Publication Data

US 2018/0161982 A1 Jun. 14, 2018

Related U.S. Application Data

(60) Provisional application No. 62/434,190, filed on Dec. 14, 2016.

(51) Int. Cl.
| | |
|---|---|
| *B25J 9/16* | (2006.01) |
| *G06K 9/00* | (2006.01) |
| *G06F 17/30* | (2006.01) |
| *G06F 16/907* | (2019.01) |
| *G06F 16/00* | (2019.01) |

(52) U.S. Cl.
CPC .......... *B25J 9/1684* (2013.01); *B25J 9/1679* (2013.01); *G06F 16/00* (2019.01); *G06F 16/907* (2019.01); *G06K 9/00013* (2013.01); *G06K 9/00885* (2013.01); *G05B 2219/32226* (2013.01); *G05B 2219/45084* (2013.01); *G06K 2209/27* (2013.01); *Y02P 90/14* (2015.11)

(58) Field of Classification Search
CPC ..... B25J 9/1684; B25J 9/1679; G06F 16/907; G06F 16/00; G06K 9/00013; G06K 9/00885; G06K 2209/27; Y02P 90/14; G05B 2219/32226; G05B 2219/45084
See application file for complete search history.

(56) References Cited

U.S. PATENT DOCUMENTS

| | | | |
|---|---|---|---|
| 10,019,566 B1 * | 7/2018 | Gallagher | G06F 21/44 |
| 2002/0165638 A1 * | 11/2002 | Bancroft | A47F 10/00 |
| | | | 700/213 |
| 2010/0217437 A1 * | 8/2010 | Sarh | B25J 9/0084 |
| | | | 700/248 |
| 2010/0235037 A1 * | 9/2010 | Vian | G07C 5/008 |
| | | | 701/31.4 |

(Continued)

*Primary Examiner* — Thomas D Alunkal

(57) ABSTRACT

Novel tools and techniques for the automated tracking of services performed on machines by service robots, technicians, and other devices are provided. A system includes a robot fingerprint reader, service tool, and robot fingerprint database. The robot fingerprint reader may be associated with a machine receiving service and configured to receive a robot fingerprint from the service tool. The service tool may be associated with the device performing the service, and include an interface that is configured to allow the robot fingerprint to be obtained by the robot fingerprint reader. The service robot may be configured to register the robot fingerprint with the robot fingerprint database, and the robot fingerprint database may be configured to create an entry associated with the robot fingerprint of the device performing the service.

20 Claims, 8 Drawing Sheets

(56) References Cited

U.S. PATENT DOCUMENTS

| | | | |
|---|---|---|---|
| 2011/0190931 A1* | 8/2011 | Anderson | G05D 1/0276 700/253 |
| 2014/0016835 A1* | 1/2014 | Song | G10L 17/06 382/118 |
| 2014/0136302 A1* | 5/2014 | Song | B25J 9/1656 705/14.4 |
| 2016/0354165 A1* | 12/2016 | Uenoyama | G06Q 30/04 |

* cited by examiner

| Time/Date 445 | Vendor ID 450 | Device ID 455 | Tool ID 460 | |
|---|---|---|---|---|
| XXXX | XXXX | XXXX | XXXX | XXXX |
| 59A8 | A300 | 0001 | 0001 | 0001 |
| XXXX | XXXX | XXXX | XXXX | XXXX |
| XXXX | XXXX | XXXX | XXXX | XXXX |

Fig. 4B

ROBOT FINGERPRINT

CROSS REFERENCE TO RELATED APPLICATIONS

This application claims priority to U.S. Provisional Patent Application Ser. No. 62/434,190 filed Dec. 14, 2016 by Michael K. Bugenhagen et al., entitled "Robot Finger Print." The disclosures of this application are incorporated herein by reference in their entirety for all purposes

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to robotics, and more particularly to tools and techniques for automatically tracking services performed on a machine by robots, technicians, or other devices.

BACKGROUND

Conventionally, repairs, upgrades, and other work performed by human technicians to various machines are currently logged as a job by a record system and identified by technician name, and or company then logged by pen and paper, or on a computerized system. When errors or mistakes are made during servicing of a machine, the maintenance person performing service may be identified to determine a cause of the error, and or to attribute ownership of the fix action when multiple organizations are involved.

As machines, such as robots, increasingly perform services on other items including, such as other machines, it is difficult to determine a root cause of an error or mistake. For example, multiple robots, each with multiple tools, may perform various services on a machine. Any individual tool of a given robot may be miscalibrated, or incorrectly program, breaking the machine being worked on or otherwise causing an error.

Accordingly, tools and techniques are provided for the automated tracking of services performed on a machine by robots, technicians, or other devices.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 4B is a schematic illustration of a physical robot fingerprint reader interface, in accordance with various embodiments;

DETAILED DESCRIPTION OF CERTAIN EMBODIMENTS

Figure 1:
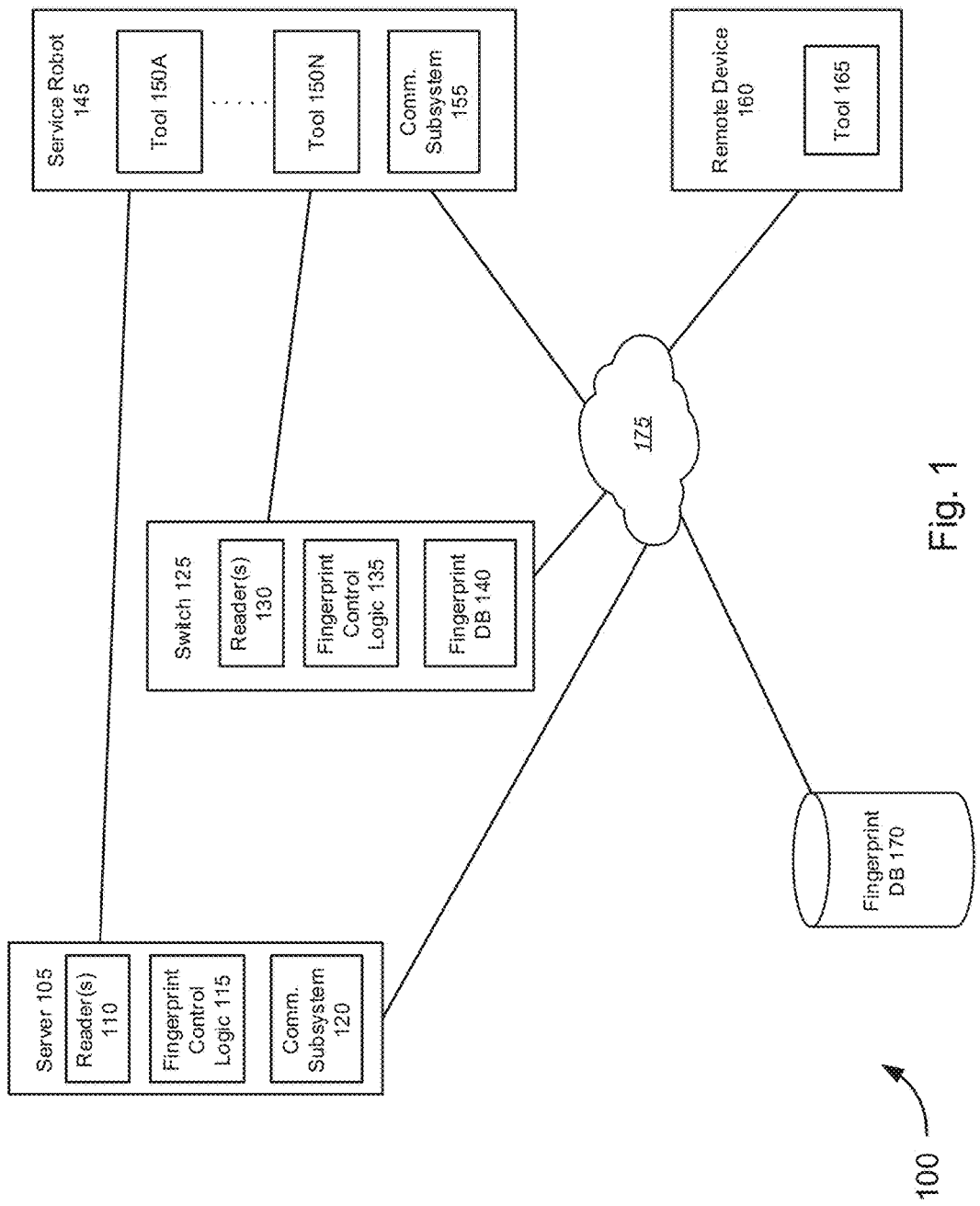
FIG. 1 is a schematic block diagram of a system for robot fingerprint service tracking, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for robot fingerprint service tracking may include a robot fingerprint reader, service tool, and robot fingerprint database. The robot fingerprint reader may be associated with a machine receiving service, and configured to receive a robot fingerprint. The service tool may be associated with the device performing the service, and include an interface configured to allow the robot fingerprint of the device performing the service to be obtained by the robot fingerprint reader. The robot fingerprint database may include a plurality of entries, each of the entries associated with a respective robot fingerprint. The robot fingerprint reader may be configured to obtain, via the interface of the service tool, the robot fingerprint of the device performing the service. The service robot may, in turn, be configured to register, with the robot fingerprint database, the robot fingerprint of the device performing the service. The robot fingerprint database may be configured to create an entry associated with the robot fingerprint of the device performing the service.

In another aspect, an apparatus for robot fingerprint service tracking may include a robot fingerprint reader configured to receive a robot fingerprint, a processor communicatively coupled to the robot fingerprint reader, and a non-transitory computer readable medium comprising instructions executable by the processor to perform various functions. This may include obtaining a robot fingerprint, via the robot fingerprint reader, from an interface of a service tool associated with a service robot. The instructions may further be executable to authenticate, based on the robot fingerprint, an identity of the service robot. The instructions may further be executable to authorize, based on the robot fingerprint, a service to be performed by the service robot. Further instructions may be executable to generate a graphical robot fingerprint output based, at least in part, on the robot fingerprint.

In a further aspect, a method for robot fingerprint service tracking may include obtaining, via a robot fingerprint reader, a robot fingerprint from an interface of a service tool associated with a service robot. The method may further include authenticating, via a robot fingerprint database, an identity of the service robot. The method may then progress with authorizing, based on the robot fingerprint, a service to be performed by the service robot. The method may continue by generating a graphical robot fingerprint output based, at least in part, on the robot fingerprint.

Various modifications and additions can be made to the embodiments discussed without departing from the scope of the invention. For example, while the embodiments described above refer to particular features, the scope of this invention also includes embodiments having different combination of features and embodiments that do not include all of the above described features.

FIG. 1 is a schematic block diagram of a system 100 for robot fingerprint service tracking. According to various embodiments, the system 100 includes various equipment and other machines to have services and/or repairs performed by a service robot 145 or remote device 160. For example, system 100 includes a server 105 and switch 125. The server 105 includes one or more readers 110, fingerprint control logic 115, and a communications subsystem 120. The switch 125, similarly, includes one or more readers 130, fingerprint control logic 135, and a local fingerprint database 140. The service robot 145 includes a plurality of tools 150A-150N (collectively 150), and a communications subsystem 155. Remove device 160 may similarly include a tool 165. The system 100 may further include a network 175, and a remote fingerprint database 170. It should be noted that the components of the system 100 are schematically illustrated in FIG. 1, and that a variety of hardware configurations are possible in accordance with various embodiments.

In various embodiments, each of the server 105, switch 125, service robot 145, remote device 160, and remote fingerprint database 170 may be communicatively coupled via network 175. In some embodiments, communication over the network 175 between one or more of the server 105, switch 125, service robot 145, remote device 160, and remote fingerprint database 170 may be optional. For example, in some embodiments, the remote device 160, communication to the server 105 and switch 125 may be established over the network 175. The service robot 145, on the other hand, may be in closer physical proximity to the server 105 or switch 125. Thus, in some embodiments, the service robot 145 may physically interface or establish direct communications with the server 105 or switch 125, while also being configured to communicate with either the server 105 or switch 125, via the network 175. Similarly, in some embodiments, one or more of the server 105, switch 125, service robot 145, and remote device 160 may access the remote fingerprint DB 170 via the network 175.

According to various embodiments, the server 105 may be scheduled to be serviced by either the service robot 145 or remote device 160. The server 105 may include one or more readers 110, fingerprint control logic 115, and communications subsystem 120. In various embodiments, the server 105 may include various types of servers, with various off-the-shelf components and devices. Unlike conventional servers, however, the server 105 may further include one or more readers 110. As will be described in greater detail below, the one or more readers 110 may be configured to read, record, receive, take, identify, or otherwise obtain a robot fingerprint of a device, such as service robot 145 or remote device 160, performing services on the server 105. Accordingly, in some embodiments, the server 105 may incorporate the one or more readers 110 and be configured to read, record, receive, take, identify, or otherwise obtain a robot fingerprint. In some alternative embodiments, the server 105 may include an off-the-shelf device that have been modified to communicate with or otherwise be operatively coupled to one or more readers 110.

In various embodiments, the fingerprint control logic 115 may, in turn, be configured to operate the one or more readers 110. For example, as will be discussed in greater detail below, the fingerprint control logic 115 may include hardware, software, of both hardware and software, communicatively coupled to the one or more readers 110 and configured to instruct the one or more readers 110 to obtain a robot fingerprint, and to perform functions, as will be described in greater detail below, based on the robot fingerprint received via the one or more readers 110. In some embodiments, the fingerprint control logic 115 may be implemented on server 105 hardware that is shared with other processes of the server 105. Alternatively, in other embodiments, the server 105 may include dedicated hardware for storing and executing the fingerprint control logic 115.

In various embodiments, communications subsystem 120 of the server 105 may, similarly, be implemented on existing server 105 hardware, or utilize separate dedicated hardware. The communications subsystem 120 may be configured to allow the server 105 to communicate with the remote fingerprint DB 170 via the network 175. The communications subsystem 120 may include, without limitation, a modem chipset (wired, wireless, cellular, etc.), an infrared (IR) communication device, a wireless communication device and/or chipset (such as a Bluetooth™ device, an 802.11 device, a WiFi device, a WiMax device, a WWAN device, a Z-Wave device, a ZigBee device, cellular device, etc.), and/or the like. The communications subsystem 120 may permit data to be exchanged with a network 175, with other computer or hardware systems, and/or with any other devices, such as the remote fingerprint DB 170, switch 125, service robot 145, and remote device 160. For example, network 175 may include, without limitation, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an IR network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. Accordingly, in some embodiments, the remote fingerprint DB 170 may allow the server 105 and/or fingerprint control logic 115 to perform various functions, including, without limitation, authentication and authorization of service robot 145, remote device 160, and the services and repairs to be performed by the service robot 145 and/or remote device 160, as will be discussed in greater detail with respect to embodiments below.

Similarly, the switch 125 may be a device on which the service robot 145 or remote device 160 is to perform services. The switch 125 may include one or more readers 130 respective to the switch 125, fingerprint control logic 135, and a local fingerprint DB 140. In some embodiments, the switch 125 may further include a respective communications subsystem. Unlike conventional switches, the one or more readers 130 of the switch 125 may be configured to read, record, receive, take, identify, or otherwise obtain a robot fingerprint of a device, such as service robot 145 or remote device 160, performing services on the switch 125. In some further embodiments, the reader may, in addition to obtaining the robot fingerprint, further record other data such as time, date, and location associated with when and where the robot fingerprint was obtained. Accordingly, in some embodiments, the switch 125 may incorporate the one or more readers 130. In some alternative embodiments, the switch 125 may include an off-the-shelf device that have been modified to communicate with or otherwise be operatively coupled to one or more readers 130.

Like in the server 105, the fingerprint control logic 135 may be configured to operate the one or more readers 130 of the switch 125. The fingerprint control logic 135 may include hardware, software, of both hardware and software, communicatively coupled to the one or more readers 130 and configured to instruct the one or more readers 130 to obtain a robot fingerprint, and to perform functions, as will be described in greater detail below, based on the robot fingerprint received via the one or more readers 130. In some embodiments, the fingerprint control logic 135 may be implemented on switch 125 hardware that may be shared with other processes of the switch 125, or alternatively, the switch 125 may include dedicated hardware and software for storing and executing the fingerprint control logic 135.

Unlike server 105, however, the switch 125 may further include a local fingerprint DB 140. Local fingerprint DB 140 may be implemented on existing switch 125 hardware and/or software, or utilize separate dedicated hardware and/or software. The local fingerprint DB 140 may be a locally stored database of robot fingerprints that serves a similar role and function as the remote fingerprint DB 170. In some embodiments, the local fingerprint DB 140 may be configured to contain data that is relevant to or anticipated to be relevant to the switch 125. In some embodiments, the switch 125 may further utilize the local fingerprint DB 140 in favor of the remote fingerprint DB 170, or use the remote fingerprint DB 170 to supplement the local fingerprint DB 140. In some embodiments, the remote fingerprint DB 170 may be configured to be updated with data from the local fingerprint DB 140, and vice versa, the local fingerprint DB 140 may be updated with data from the remote fingerprint DB 170. Thus, in some embodiments, the local fingerprint DB 140, may be in communication with the remote fingerprint DB 170 via, for example, a communications subsystem (not depicted) of the switch 125. Like the remote fingerprint DB 170, the local fingerprint DB 140 may include information regarding robot fingerprints allowing the switch 125 and/or fingerprint control logic 135 to perform various functions, including, without limitation, authentication and authorization of service robot 145, remote device 160, and the services and repairs to be performed by the service robot 145 and/or remote device 160, as will be discussed in greater detail with respect to embodiments below.

In various embodiments, the one or more readers 110 of the server 105, and the one or more readers 130 of the switch 125, may include various types of robot fingerprint readers. Thus, the types of robot fingerprint the server 105 and switch 125 are configured to receive may correspond to the types of robot fingerprint reader installed on the server 105 and switch 125. Types of robot fingerprint readers may include, without limitation, acoustic readers, optical readers, radio-frequency (RF) readers, electronic readers, and physical readers. For example, acoustic readers may include, without limitation, microphones. Optical readers may include, without limitation, various types of cameras (IR, visible light, UV, etc.), photodetectors, barcode scanners, light sensors, IR sensors, laser sensors, and other light-sensitive devices. RF readers may include, without limitation, various types of RF receivers, transmitters, transceivers, radios, antennas, and other like devices capable of wireless RF communication. This may include, without limitation, wireless communication as defined by IEEE 802.11 standards (Wi-Fi), Bluetooth, IR, cellular, near field communications (NFC), ultra-high frequency (UHF), very-high frequency (VHF), extremely high frequency (EHF), and other RF communications. Electronic readers may include software-based readers for analyzing program or code for a robot fingerprint, various chip readers for reading robot fingerprints stored as data on electronic media, such as on microchips, integrated circuits (IC), flash drives and other solid-state devices, optical media readers for reading robot fingerprints stored on optical media (compact discs, digital video discs, Blu-ray discs, and other optical discs), and magnetic stripe readers. Physical readers may include readers configured to receive a physical robot fingerprint, such as, without limitation, an area dedicated to receiving a microstamp of the robot fingerprint, an area dedicated to receiving an engraving of the robot fingerprint, a touch-sensitive surface (e.g., capacitive, resistive, acoustic, dispersive), an electrically conductive surface, an electronic paper (e-paper) surface or display operatively coupled to a touch-sensor, or other device that is responsive to physical contact to receive the robot fingerprint. In further embodiments, each of the one or more readers 110, 130 may include various types of reader interfaces configured to allow the one or more readers 110, 130 to obtain the various robot fingerprints from the service robot 145, remote device 160, plurality of tools 150, or tool 165. Reader interfaces may include, without limitation, various electronic ports (e.g., various USB, Ethernet, serial, etc.), connectors, jacks, a scanner interface, such as a window or receptacle, or any other interface through which the one or more readers 110, 130 may receive the various types of robot fingerprints.

The fingerprint control logic 115, 135 of the server 105 and switch 125, as previously described, may include hardware and/or software. For example, in some embodiments, the fingerprint control logic 115, 135 may be implemented on an IC, such as a system on a chip (SoC) or application-specific integrated circuit (ASIC). In some embodiments, the fingerprint control logic 115, 135 may include computer readable instructions operable on an existing processor. In various embodiments, the fingerprint control logic 115, 135 may include, without limitation, a set of computer readable instructions configured to be executed by the processor utilize a respective set of one or more fingerprint readers 110, 130, and perform various functions. For example, in some embodiments, the fingerprint control logic 115, 135 may be configured to read or otherwise obtain robot fingerprints via the one or more fingerprint readers 110, 130, as previously described. The fingerprint control logic 115, 135 may further be configured to identify and authenticate the robot fingerprint. For example, in various embodiments, the robot fingerprint may be associated with a service robot 145, remote device 160, or other device performing a service. The robot fingerprint may further include information regarding the specific tool used by the service robot 145, remote device 160, or other device performing the service, the service provider, vendor, and/or specific service order. Thus, the fingerprint control logic 115, 135 may further identify and authenticate the robot fingerprint. This may include decoding a robot fingerprint, for example, by retrieving information associated with the robot fingerprint on the local fingerprint DB 140 and/or remote fingerprint DB 170. The fingerprint control logic 115, 135 may further be configured to authorize a service, service robot 145, remote device 160, or other device performing the service, based on the robot fingerprint. This may include authorization of the services to be performed based on the robot fingerprint. The fingerprint control logic 115, 135 may further be configured to display the robot fingerprint and/or information associated with the robot fingerprint. For example, the fingerprint control logic 115, 135 may cause information about the services to be performed, information about the device performing the services, the tools used, and the vendor performing the services, to be displayed. Furthermore, in some embodiments, the fingerprint control logic 115, 135 may be configured to cause "touches," or areas in which contact was made, to be displayed. For example, touches may be displayed on a dedicated display or other user interface, depicting all areas in which contact was made on the machine being serviced by the device performing the service on a computer-generated model or other illustration of the machine being serviced. In further embodiments, the one or more readers 110, 130 of the machine being serviced may include an electronic skin that displays the touches on the electronic skin. For example, electronic skin may include an e-paper display covering all or part of the surfaces of the machine being serviced. The e-paper display may be operatively coupled to a touch sensor, associating touches with corresponding locations on the electronic skin. In some embodiments, the fingerprint control logic 115, 135 may be configured to control the display of touches associated with individual robot fingerprints, sets or subsets of robot fingerprints associated with specific jobs, service orders, vendors, service robots, tools, or all robot fingerprints.

As depicted in FIG. 1, the devices performing services in the system 100 include the service robot 145 and remote device 160. The service robot 145 may include a plurality of tools 150, and a communications subsystem 155. Although the service robot 145 is depicted as include a plurality of tools 150, it is to be understood that in some embodiments, the service robot 145 may have a single tool. The communications subsystem 155, like the communications subsystem 120 of the server 105, may be configured to allow the service robot 145 to communicate over the network 175, or in some embodiments, to communicate directly with the machine being serviced, such as the server 105 or switch 125. Each of the plurality of tool 150 may allow the service robot 145 to perform a service. For example, in some embodiments, a tool 150A-N may be a physical tool, including, without limitation, a robotic arm, screwdriver, clamp, plier, claw, soldering tool, or any other physical tool that may be utilized during the performance of a service. Some tools may be electronic tools, including, without limitation, a software program or code that may be loaded to or executed by the machine being serviced. In some embodiments, the software may be stored on various computer readable media, such as microchips, ICs, SoCs, ASICs, flash drives and other solid-state devices, optical discs, and other storage media that may be configured to interface directly with the one or more readers 110, 130 of the machine being serviced. In other embodiments, the electronic tool may be software code that is stored remotely, and accessible by either the service robot 145, server 105, or switch 125 over the network 175. For example, in some embodiments, the remote device 160 includes tool 165, which may be a software tool that is accessible over the network 175. In some embodiments, the remote device 160 may be located remotely from the physical location of the server 105, switch 125, or other machine being serviced. The remote device 160 may, therefore, be configured to access the switch 125 and server 105 via a network connection over network 175, and in some examples, the remote device 160 may be accessible by the service robot 145 via the network 175.

Accordingly, in various embodiments, the service robot 145 may be configured to perform services on the server 105 and/or switch 125 in close physical proximity to the server 105 and/or switch 125, such that physical and/or mechanical service and repair may be performed by the service robot 145. For example, the server 105 and switch 125 may be located within a data center, server farm, or other similar facility. The service robot 145 may, therefore, be deployed physically to the data center and/or server farm housing the server 105 and switch 125. In contrast, the remote device 160 may be located remotely from the server and/or switch 125. Thus, the remote device 160 may be configured to access the server 105 and/or switch 125 via the network 175.

The plurality of tools 150 of the service robot 145, the tool 165 of the remote device 160, the service robot 145 itself, and the remote device 160 may respectively utilize or otherwise be associated with different types of robot fingerprints, depending on the characteristics of the specific tool or device performing service. For example, the types of robot fingerprints may correspond to the various types of readers 110, 130 of the server 105 and switch 125 described above.

For example, a robot fingerprint may be an acoustic identifier associated with the device performing the service, such as service robot 145 and/or remote device 160. In one example, the acoustic identifier may be an encoded acoustic signal, such as a sound played by the service robot 145.

In some embodiments, a robot fingerprint may be an optical fingerprint. This may include a visible tag, barcode, numbers, text, both numbers and text (e.g., alphanumeric characters), symbols, images, identifying insignia, an optical signal transmitted via light emitting diode (LED), laser, IR transmitter, or other identifying information that may be scanned, recorded, or otherwise captured optically.

In some embodiments, the robot fingerprint may be an RF identifier. For example, the service robot 145 may be configured transmit the robot fingerprint via a RF wireless signal. Thus, the robot fingerprint may be transmitted via Wi-Fi, Bluetooth, cellular, NFC, UHF, VHF, EHF, and other communications. In some embodiments, the robot fingerprint may be a RF readable device, such as a radio frequency identification (RFID) tag, NFC chip, or the like.

In some embodiments, the robot fingerprint may be an electronic identifier embedded in program code, or encoded as an electronic signal (digital or analog). For example, the robot fingerprint may be an encoded string or other digital identifier that may be transmitted electronically, or in some embodiments, a digital and/or analog electrical signal transmitted via electrical contact (e.g., electrostatic contact) between the service robot 145 and the machine being serviced. In some embodiments, the electronic fingerprint may be stored on various machine-readable media, including, without limitation, an IC, flash and other solid-state media, or optical storage media.

In yet further embodiments, the robot fingerprint may be a physical fingerprint. For example, physical fingerprints may include a microstamp that may be transmitted via mechanical pressure, or an engraver such as a laser engraver or mechanical engraver. In some embodiments, physical contact may impart a robot fingerprint on a touch-sensitive surface of the machine being serviced, in which the robot fingerprint may be identified by timestamp. In some further embodiments, the various types of robot fingerprints may be combined to uniquely identify the device performing the service (e.g., service robot 145 or remote device 160), and to determine changes caused and repairs effected by the device performing the service. For example, an optical fingerprint may identify the tool, device, and/or vendor performing the service, while the physical fingerprint may indicate locations on the machine being serviced in which contact was made with the device performing the service.

In some embodiments, the service robot 145, remote device 160, the plurality of tools 150, or the tool 165 may be configured to transmit the robot fingerprint in response to a request for a robot fingerprint from the machine being serviced. As previously described, the robot fingerprint may include various identifying information. This may include, without limitation, identification of a tool, the specific device performing the service (e.g., service robot 145 or remote device 160, the service provider, vendor, and specific service order. In some further embodiments, the robot fingerprint may also include metadata. For example, in some embodiments, the metadata may be indicative of additional detail regarding the service order, types of services to be performed (e.g., mechanical repair, software update, hardware update, hardware replacement, hardware modification, etc.), the user or customer requesting the service, and other information.

In various embodiments, the robot fingerprint, and information associated with the robot fingerprint, may be registered at a robot fingerprint DB, such as remote fingerprint DB 170 or local fingerprint DB 140. As previously described, the remote fingerprint DB 170 may be accessible via the network 175. The remote fingerprint DB 170 may, in some embodiments, be a global database comprising a plurality of entries associated with various robot fingerprints. The remote fingerprint DB 170 may further be configured to allow the registration of robot fingerprints. For example, service providers and/or vendors may register various tools, service robots, remote devices, and other devices performing services with the remote fingerprint DB 170. In some embodiments, registration of robot fingerprints associated with tools may be automated. For example, when a new tool is added to the service robot 145, the service robot 145 may be configured to register the tool with the remote fingerprint DB 170. This may include sending a registration request to the remote fingerprint DB 170. In response to a registration request, the remote fingerprint DB 170 may be configured to assign a robot fingerprint to the tool of the service robot 145. In some embodiments, the registration request may include identifying information of the specific service robot 145, vendor and/or service provider of the service robot 145, and information about the tool. In some further embodiments, a new unique robot fingerprint may be created for each action, transaction, or service performed by a specific tool 150A-N, 165, service robot 145, remote device 160, or other device performing the service. For example, a new robot fingerprint may be created and registered with a robot fingerprint DB, such as remote fingerprint DB 170 or local fingerprint DB 140, each time any action is to be taken during the performance of a service.

In some embodiments, the remote fingerprint DB 170 may be configured to allow vendors, service providers, service robots 145, remote devices 160, and technicians to update robot fingerprint entries, and to associate additional information, such as metadata, with specific robot fingerprints. The remote fingerprint DB 170, in response to being updated, may, in some embodiments, push out updated information to each of the devices, such as server 105, switch 125, local fingerprint DB 140, service robot 145, and remote device 160. In other embodiments, the remote fingerprint DB 170 may be queried to obtain updated information regarding the robot fingerprints. Moreover, as previously described, the local fingerprint DB 140 may similarly propagate updates locally, or synchronize with the remote fingerprint DB 170. In various embodiments, a specialized fingerprint API may be provided for interfacing with the remote fingerprint DB 170 to register, update, access, and otherwise modify robot fingerprints. Similarly, the fingerprint API may similarly be configured to allow information (e.g., metadata) associated with the robot fingerprints to be added, updated, obtained, or otherwise modified.

In an example, according to some embodiments, services may be scheduled for the server 105 and switch 125. The service robot 145 may be deployed by a service provider to perform the scheduled services. Some services may be performed remotely, via the remote device 160, such as remote deployment of a software update. In some embodiments, each of the service robot 145 and remote device 160 may first be authenticated and authorized to perform the services. As previously described, authentication and authorization may be performed based on the robot fingerprints associated with each of the service robot 145 and the remote device 160. In some embodiments, the service robot 145 may first access a reader interface of the server 105 and/or switch 125. For example, in some embodiments, the reader interface may include an electronic interface, physical opening, window, or designated area for receiving a tool 150A-N of the plurality of tools 150, from which a robot fingerprint may be obtained by the one or more readers 110, 130 of the server 105 and switch 125. Once the robot fingerprint has been obtained, the fingerprint control logic 115, 135 of the server 105 and/or switch 125, respectively, may perform authentication and authorization of the various services. In some embodiments, the server 105 and switch 125 may further make a record of the robot fingerprint and any information associated with the robot fingerprint. In some embodiments, the server 105 may update, transmit, and/or store this information at the remote fingerprint DB 170. In contrast, the switch 125 may update and/or store this information locally, at local fingerprint DB 140. In some embodiments, the switch 125 may later optionally update this information at the remote fingerprint DB 170. In further embodiments, as previously described, the server 105 and/or switch 125 may be configured to graphically display the robot fingerprints and/or information about the robot fingerprints, such as the services to be performed, information about the device performing the services, the tools used, and the vendor performing the services. Furthermore, in some embodiments, touches may also be displayed.

Figure 2:
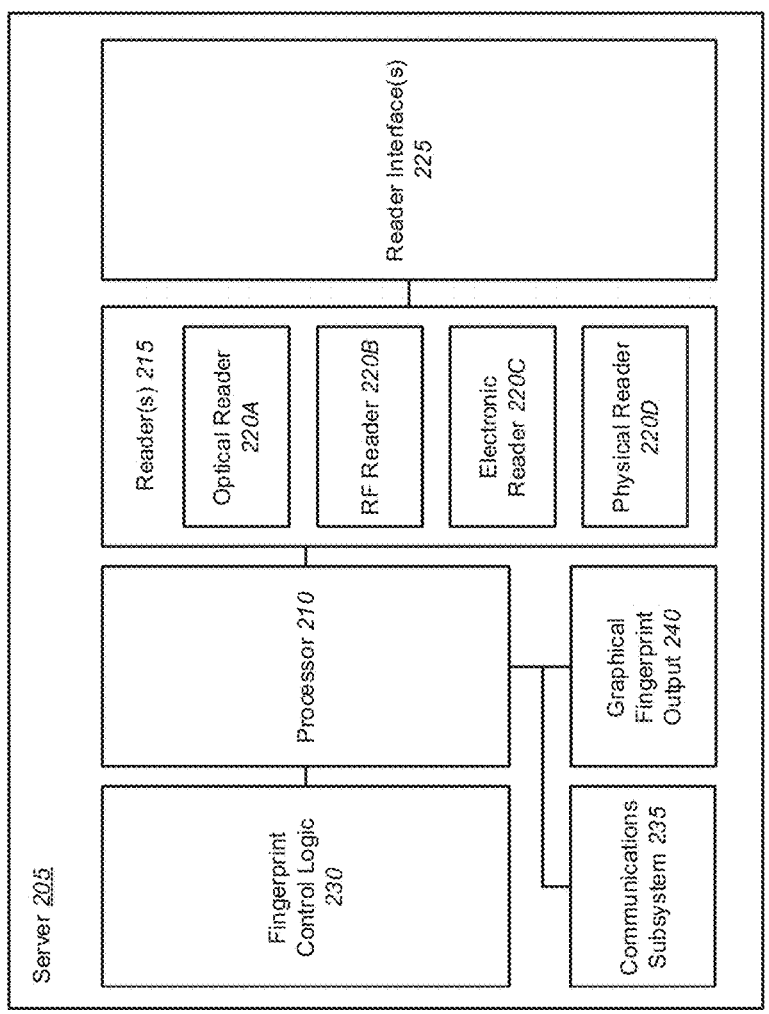
FIG. 2 is a schematic block diagram of an apparatus for robot fingerprint service tracking on a machine being serviced, in accordance with various embodiments.

FIG. 2 is a schematic block diagram 200 of an apparatus for robot fingerprint service tracking on a machine being serviced. For example, in the depicted embodiments, the block diagram 200 may be a hardware block diagram for a server 205. The server 205 may include a processor 210, one or more readers 215 including an optical reader 220A, RF reader 220B, electronic reader 220C, and physical reader 220D, a reader interface 225, fingerprint control logic 230, communications subsystem 235, and graphical fingerprint output 240. It should be noted that the components of the server 205 are schematically illustrated in FIG. 2 and that different hardware configurations are possible in accordance with various embodiments.

In the embodiments depicted, the processor 210 may be in communication with one or more readers 215, including the optical reader 220A, RF reader 220B, electronic reader 220C, and physical reader 220D. The processor 210 may further be communicatively coupled to the fingerprint control logic 230, communications subsystem 235, and graphical fingerprint output 240. The one or more readers 215 may be operatively coupled to one or more respective reader interfaces 225.

As previously described with respect to FIG. 1, the fingerprint control logic 230 may include hardware and/or software. For example, in some embodiments, the fingerprint control logic 230 may be implemented on an IC, such as an ASIC or SoC. In some embodiments, fingerprint control logic 230 may include computer readable instructions executable by the processor 210 to perform various functions. The fingerprint control logic 230 may be stored locally on computer readable media, such as system memory, non-volatile memory, non-volatile storage media, or other systems.

For example, fingerprint control logic 230 may include instructions to operate the one or more readers 215 to read, record, receive, take, identify, or otherwise obtain a robot fingerprint via a respective reader interface 225. The fingerprint control logic 230 may include further instructions to identify and authenticate the robot fingerprint. For example, in various embodiments, the robot fingerprint may be associated with a specific device performing a service. The robot fingerprint may further include information regarding the specific tool being used, the service provider associated with the device performing the service, vendor, and/or specific service order. Identifying and authenticating may include decoding a robot fingerprint, for example, by retrieving information associated with the robot fingerprint on a local fingerprint DB and/or remote fingerprint DB.

The fingerprint control logic 230 may further be configured to authorize a service to be performed, or device performing the service, based on the robot fingerprint. This may include receiving or making accessible various interfaces to receive the various tools for performing the service. The fingerprint control logic 230 may further be configured to display the robot fingerprint and/or information associated with the robot fingerprint. For example, the fingerprint control logic 230 may cause information about the services to be performed, information about the device performing the services, the tools used, and the vendor performing the services, to be displayed. As previously discussed with respect to FIG. 1, in some embodiments, the fingerprint control logic 230 may be configured to display touches. Touches may be displayed via the graphical fingerprint output 240. The graphical fingerprint output 240 may include an electronic skin surrounding the server 205, or a dedicated display on the server 205. In yet further embodiments, the touches may be displayed on a remote display, via the graphical fingerprint output 240, which may be accessible over a communications network. For example, in some further embodiments, the graphical fingerprint output 240 may be coupled to a communications subsystem 235, through which a communications network may be accessed. In some embodiments, the fingerprint control logic 230 may be configured to control the graphical fingerprint output 240 to display all robot fingerprints, or a set or subset of robot fingerprints associated with specific jobs, service orders, vendors, service robots, or tools.

In yet further embodiments, the fingerprint control logic 230 may be configured to update and/or modify information about robot fingerprints. For example, a remote fingerprint DB, or alternatively a local fingerprint DB, may be updated with information about specific jobs, service orders, vendors, service robots, or tools that have completed as job. In some embodiments, updating information may include reporting the status of a service order as being started, in progress, or completed. This status information may be transmitted, via the communications subsystem, to a remote fingerprint DB, or a local fingerprint DB may be updated. In some embodiments, the fingerprint control logic 230 may instruct a local fingerprint DB to be synchronized with a remote fingerprint DB.

In various embodiments, the server 205 may include one or more readers 215 in communication with the fingerprint control logic 230. The one or more readers 215 may include various types of robot fingerprint readers, including the optical reader 220A, RF reader 220B, electronic reader 220C, and physical reader 220D. As previously described, the optical reader 220A may include various types of fingerprint readers for reading an optical fingerprint. An optical reader 220A may include, without limitation, various types of cameras (IR, visible light, UV, etc.), photodetectors, barcode scanners, light sensors, IR sensors, laser sensors, and other light-sensitive devices for detecting optical fingerprints. An RF reader 220B may include, without limitation, various types of RF receivers, transmitters, transceivers, radios, antennas, and other like devices capable of wireless RF communication for detecting RF fingerprint (e.g., RF identifier). This may include, without limitation, wireless communication as defined by IEEE 802.11 standards (Wi-Fi), Bluetooth, IR, cellular, near field communications (NFC), ultra-high frequency (UHF), very-high frequency (VHF), extremely high frequency (EHF), and other RF communications. An electronic reader 220C may include software-based readers for analyzing program or code for an electronic robot fingerprint, various chip readers for reading robot fingerprints stored as data on electronic media, such as on microchips, integrated circuits (IC), flash drives and other solid-state devices, optical media readers for reading robot fingerprints stored on optical media (compact discs, digital video discs, Blu-ray discs, and other optical discs), and magnetic stripe readers. A physical reader 220D may include readers configured to receive a physical robot fingerprint, such as, without limitation, an area dedicated to receiving a microstamp of the robot fingerprint, an area dedicated to receiving an engraving of the robot fingerprint, a touch-sensitive surface (e.g., capacitive, resistive, acoustic, dispersive), an electrically conductive surface, an electronic paper (e-paper) surface or display operatively coupled to a touch-sensor, or other device that is responsive to physical contact to receive the robot fingerprint. In some embodiments, the physical reader 220D may further include acoustic readers, such as, without limitation, microphones, for detecting acoustic signals indicative of a robot fingerprint.

In further embodiments, each of the one or more readers 215 may include or be coupled to a respective reader interface 225. The one or more reader interfaces 225 may be configured to allow the one or more readers 215 to obtain the various robot fingerprints from a device performing the service, such as a service robot, remote device or specific tool. Reader interfaces 225 may include, without limitation, various electronic ports (e.g., various USB, Ethernet, serial, etc.), connectors, jacks, a scanner interface, such as a window or receptacle, or any other interface through which the one or more readers 215 may receive the robot fingerprint. In some further embodiments, the reader interface 225 may be an electrically conductive body of the server 205, or at least part of the graphical fingerprint output 240.

In various embodiments, the communications subsystem 235 of the server 205 may be implemented on existing server 205 hardware, or utilize separate dedicated hardware. The communications subsystem 235 may be configured to allow the server 205 to communicate over a communications network with, for example, a remote fingerprint DB, a service robot, or remote device. In yet further embodiments, the communications subsystem 235 may be configured to allow direct electronic communications with a service robot, specific tools, or other device performing services. The communications subsystem 235 may include, without limitation, a modem chipset (wired, wireless, cellular, etc.), an infrared (IR) communication device, a wireless communication device and/or chipset (such as a Bluetooth™ device, an 802.11 device, a WiFi device, a WiMax device, a WWAN device, a Z-Wave device, a ZigBee device, cellular device, etc.), and/or the like. Accordingly, in various embodiments, the communications subsystem 235 may allow the server 205 and/or fingerprint control logic 230 to perform various functions as previously described.

Figure 3:
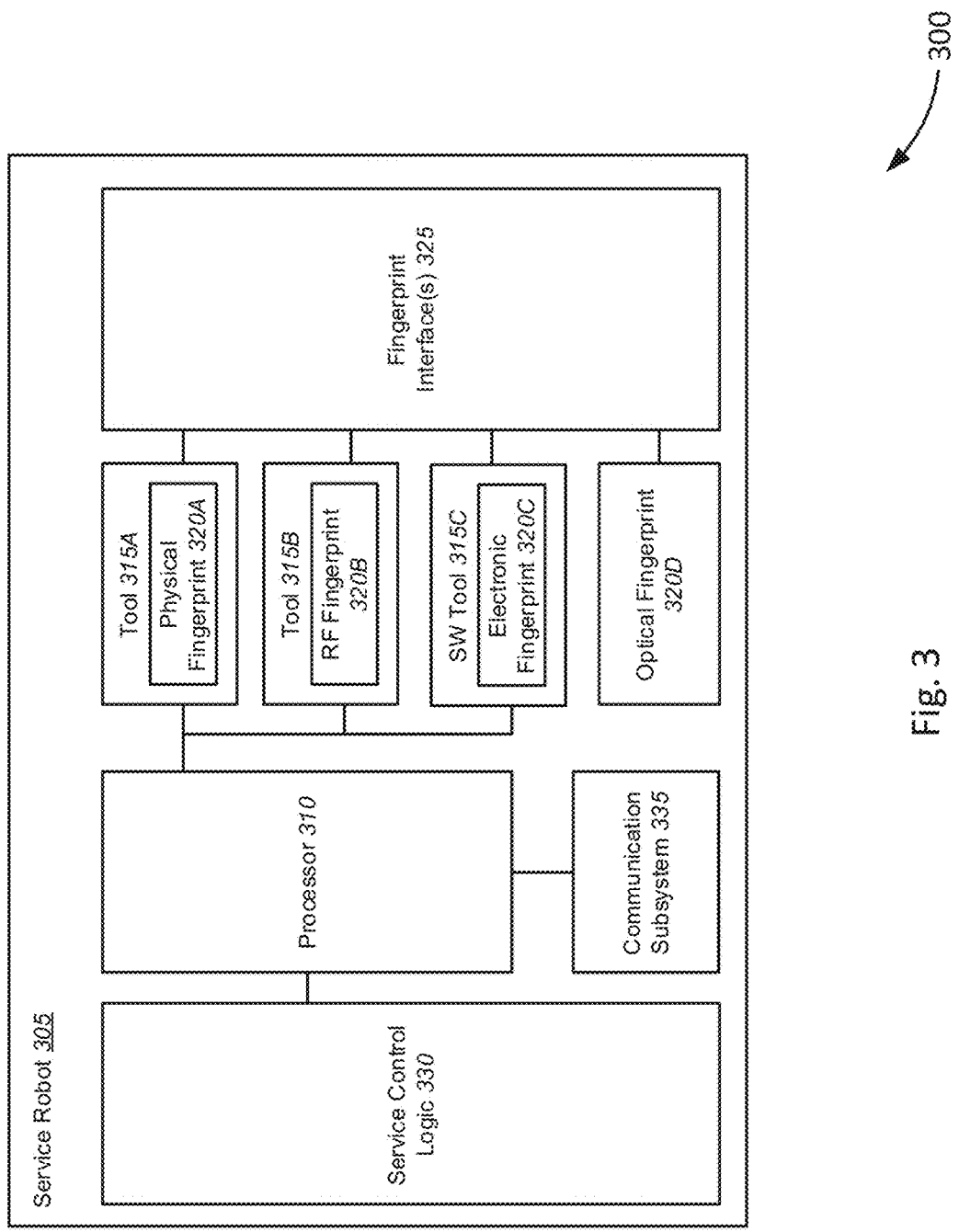
FIG. 3 is a schematic block diagram of an apparatus for robot fingerprint service tracking on a device performing the service, in accordance with various embodiments.

FIG. 3 is a schematic block diagram 300 of an apparatus for robot fingerprint service tracking on a machine performing the service, in accordance with various embodiments. For example, in the depicted embodiments, the block diagram 300 may be a hardware block diagram for a service robot 305. The service robot 305 may include a processor 310, tools 315A-315C (collectively "the one or more tools 315"), each tool with a respective service robot fingerprint 320A-320C, and an optical fingerprint 320D (collectively "the one or more fingerprints 320"), a fingerprint interface 325, service control logic 330, and a communications subsystem 335. It should be noted that the components of the server robot 305 are schematically illustrated in FIG. 3, and that a variety of hardware configurations are possible in accordance with various embodiments.

In various embodiments, the processor 310 may be in communication with the one or more tools 315, each of the one or more tools including a respective fingerprint 320A-320C of the one or more fingerprints 320. The processor 310 may further be communicatively coupled to the service control logic 330 and communications subsystem 335. The service robot 305 itself may include or otherwise be associated with an optical fingerprint 320D. The one or more tools 315 and one or more fingerprints 320 may be operatively coupled to one or more respective fingerprint interfaces 325.

In various embodiments, the service control logic 330 may include hardware and/or software configured to enable the service robot 305 to perform various functions, as previously described with respect to FIG. 1. In some embodiments, like the fingerprint control logic 115, 135, 230, the service control logic 330 may be implemented on an IC, such as an ASIC or SoC. In some embodiments, service control logic 330 may include computer readable instructions executable by the processor 310 to perform various functions. The service control logic 330 may be stored locally on computer readable media, such as system memory, non-volatile memory, non-volatile storage media, or other systems.

For example, in some embodiments, service control logic 330 may include instructions to operate the one or more tools 315 to perform a service, to transmit or make accessible the one or more fingerprints 320, and respond to requests for a robot fingerprint from a machine being serviced. In various embodiments, the one or more fingerprints 320 may be made available via a respective fingerprint interface 325. In some embodiments, the service control logic 330 may cause the service robot 305 to transmit the physical fingerprint 320A, associated with tool 315A, via a respective fingerprint interface 325, to a respective reader interface of a machine being serviced. For example, the physical fingerprint 320A may be a microstamp to be transferred. Accordingly, the respective fingerprint interface 325 may be a physical stamp coupled to the tool 315A, configured to be pressed into a reader interface, which may be a reserved area on the machine being serviced for receiving the physical fingerprint 320A (e.g., microstamp).

Similarly, the service control logic 330 may cause the service robot 305 to transmit an RF fingerprint 320B, associated with tool 315B, via respective fingerprint interface 325, to a respective reader interface of the machine being serviced. The RF fingerprint may be a wirelessly transmitted fingerprint. Accordingly, the respective fingerprint interface 325 may be an interface for transmitting the RF fingerprint 320B, such as an RFID tag (both passive and active), RF transceiver and antenna, NFC chip, or other suitable interface configured to transmit the RF fingerprint. Thus, the service control logic 330 may be configured to activate the respective fingerprint interface 325, or to place the fingerprint interface 325 (e.g., RFID tag, NFC chip) in physical proximity to a respective RFID reader or NFC chip reader of the machine being serviced.

In some embodiments, the service control logic 330 may cause the service robot 305 to transmit an electronic fingerprint 320C, associated with tool 315C, via respective fingerprint interface 325, to a respective reader interface of the machine being serviced. The electronic fingerprint may be an electronically transmitted fingerprint, such as a digitally encoded fingerprint, a software fingerprint, an electrical signal (digital or analog) or the like. Accordingly, the respective fingerprint interface 325 may be an interface configured transmitting the electronic fingerprint 320C, such as an electronic connector (e.g., various USB, Ethernet, serial, etc.), jack, a wired or wireless communication link, an electrically conductive surface for transmitting an electrical fingerprint through physical contact, or another suitable interface. Accordingly, the reader interface may include electronic ports (e.g., various USB, Ethernet, serial, etc.), connectors, jacks, communication links, electrically conductive surface, or other suitable interface for receiving the robot fingerprint from the one or more fingerprint interfaces 325.

The service robot 305 may further include an optical fingerprint 320D associated with the service robot 305 itself. In some embodiments, the service control logic 330 may be cause the service control robot 305 to move, position, or otherwise make the optical fingerprint 320D available to be read by a reader interface. As previously described, the optical fingerprint may be an optically-readable fingerprint, including, without limitation, a visible tag, barcode, numbers, text, both numbers and text (e.g., alphanumeric characters), symbols, images, identifying insignia, an optical signal transmitted via LED, laser, IR transmitter, or other identifying information that may be scanned, recorded, or otherwise captured optically. Accordingly, the type of fingerprint interface 325 used may depend on the type of optical fingerprint 320D utilized by the service robot 305. For example, in some embodiments, the associated fingerprint interface 325 for the optical fingerprint 320D may be a designated area on the service robot 305 in which the optical fingerprint 320D may be located and/or displayed. In other embodiments, the fingerprint interface 325 may be a laser light source, LED, IR light source, or electronic display for transmitting and/or displaying the optical fingerprint 320D.

Similar to the communications subsystems previously described, the communications subsystem 335 of the service robot 305 may be include software, hardware, or both software and hardware. The communications subsystem 335 may be configured to allow the service robot 305 to communicate over a network. For example, the service robot 305 may communicate with a remote fingerprint DB, a server, switch, or remote device over a network connection. In yet further embodiments, the communications subsystem 335 may be configured to allow direct electronic communications with a server or switch, or other machine being serviced, or with specific fingerprint readers or reader interfaces. The communications subsystem 335 may include, without limitation, a modem chipset (wired, wireless, cellular, etc.), an infrared (IR) communication device, a wireless communication device and/or chipset (such as a Bluetooth™ device, an 802.11 device, a WiFi device, a WiMax device, a WWAN device, a Z-Wave device, a ZigBee device, cellular device, etc.), and/or the like. Accordingly, in various embodiments, the communications subsystem 335 may allow the service robot 305 and/or service control logic 330 to perform various functions as previously described.

Figure 4A:
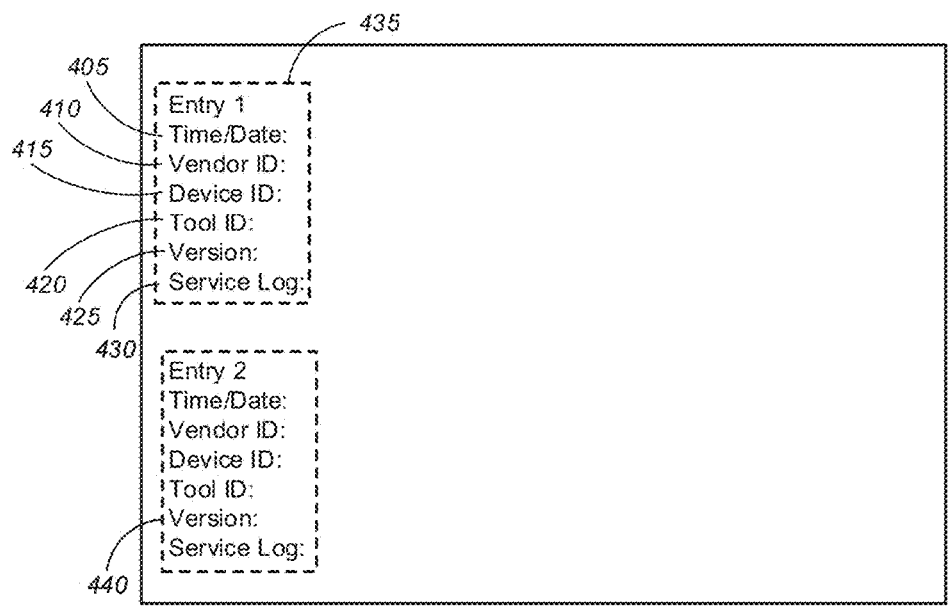
FIG. 4A is a schematic illustration of a graphical robot fingerprint output, in accordance with various embodiments.
Figure 4C:
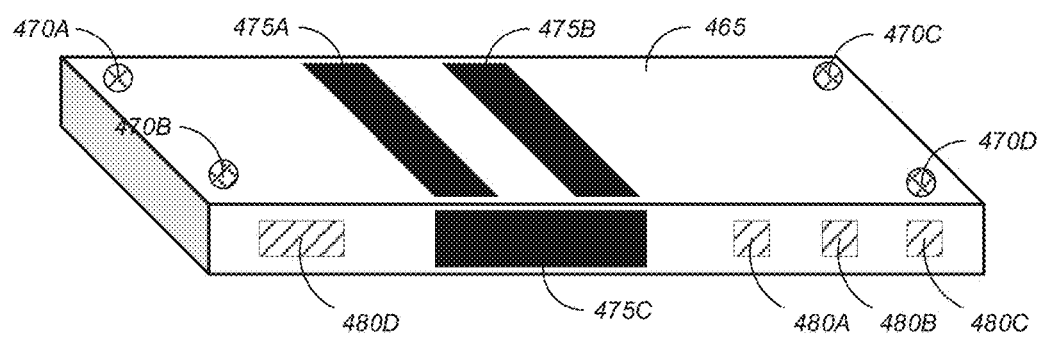
FIG. 4C is a schematic illustration of an alternative graphical robot fingerprint output, in accordance with various embodiments.

FIGS. 4A-4C illustrates some examples of graphical fingerprint outputs, robot fingerprints, and reader interfaces, according to various embodiments. For example, FIG. 4A is a schematic illustration of a graphical fingerprint output 400A, in accordance with various embodiments. The graphical fingerprint output 400A may include a first entry 435 including a time and date field, vendor identification (ID) field 410, device ID field 415, tool ID field 420, version field 425, and service log field 430. The graphical fingerprint output 400A may further include a second entry 440, with similar fields. It should be noted that the entries and fields of the graphical fingerprint output 400A are schematically illustrated in FIG. 4A, and that a variety of configurations are possible in accordance with various embodiments.

The graphical fingerprint output 400A illustrates an example of the type of information that may be determined and displayed, based on a robot fingerprint that is read by a machine being serviced. For example, in some embodiments, the first entry 405 may be associated with a first service, and include information based on one or more robot fingerprints. The time and date field 405 may indicate a time and a date on which a service was performed, a robot fingerprint read, or contact made between a device performing a service and machine being serviced. In some embodiments, the time and date 405 field may be retrieved from a remote fingerprint DB or local fingerprint DB, based on the robot fingerprint, as previously described.

The vendor ID field 410 may indicate a vendor associated with the robot fingerprint. In some embodiments, vendor ID may be associated with the device performing the service, such as a service robot, remote device, the tool used to perform the service, such as a software tool or physical tool, or alternatively, identify the vendor responsible for performing the service. In some embodiments, the vendor ID displayed in the vendor ID field 410 may be a code of alphanumeric and/or non-alphanumeric characters associated with a specific vendor. In some further embodiments, the vendor ID displayed in the vendor ID field 410 may indicate a name of the vendor, such as the name of an individual, commercial entity, internal group, or other organization. In some embodiments, the code for the vendor ID may be part of the robot fingerprint itself. In other embodiments, the vendor ID may be obtained via a remote fingerprint DB or local fingerprint DB, based on the robot fingerprint, as previously described.

The device ID field 415 may indicate a specific device performing the service, such as a service robot or remote device. In some embodiments, the device ID may be a code of alphanumeric and/or non-alphanumeric characters associated with the specific device performing the service. Accordingly, the device ID field 415 may display the code associated with the device performing the service, or otherwise identify the specific device associated with the service being performed. In some embodiments, the device ID may be part of the robot fingerprint, while in other embodiments, the device ID may be obtained via a remote fingerprint DB or local fingerprint DB, based on the robot fingerprint, as previously described.

The tool ID field 420 may indicate the specific tool used to perform the service. As previously described, the tool may be a physical tool, or a software tool. Accordingly, the tool ID may be a code of alphanumeric and/or non-alphanumeric characters associated with the specific tool used to perform the service. Accordingly, the tool ID field 420 may display the code associated with the tool used to perform the service. In some embodiments, the tool ID field 420 may display multiple codes associated with one or more tools that were used to perform the service. In some embodiments, the tool ID may be part of the robot fingerprint, such as a field within the robot fingerprint, while in other embodiments, the tool ID may be obtained via a remote fingerprint DB or local fingerprint DB, based on the robot fingerprint, as previously described.

The version field 425 may be an optional field used to indicate the version of a tool used to perform the service. As previously described, the tool may be a physical tool, or a software tool. Accordingly, in the case of a software tool, the version may indicate a version of a software tool used in performing the service. The version may be a code of alphanumeric and/or non-alphanumeric characters associated with the tool. Accordingly, the version field 425 may display the code associated with the specific tool used to perform the service. In some embodiments, the version may be included as part of the robot fingerprint, such as a field within the robot fingerprint, while in other embodiments, the version of the tool may be obtained via a remote fingerprint DB or local fingerprint DB, based on the robot fingerprint, as previously described.

The service log field 430 may indicate notes, details, comments, or other information about the service that was performed. For example, the service log field 430 may indicate, without limitation, that firmware and/or software that was updated, specific problems that were troubleshooted, or details regarding specific hardware modifications, repairs, and replacements. Accordingly, information regarding the service log may be generated by a device performing the service, provided after the service has been performed, or provided from a priori sources. In some embodiments, information for the service log may be provided as part of the robot fingerprint, such as a field within the robot fingerprint, while in other embodiments, the service log information may be obtained via a remote fingerprint DB or local fingerprint DB, based on the robot fingerprint, as previously described.

The second entry 440 may be used to display information associated with a second service that was performed, and based on a second set of one or more robot fingerprints. In some embodiments, the second entry may be generated based on a second device performing a service, a second contact from the device performing a service, or based on a second scheduled service. In various embodiments, the fields of the second entry 440 may be populated similarly to the first entry 435 as described above.

FIG. 4B is a schematic illustration of a physical robot fingerprint reader interface 400B, in accordance with various embodiments. The physical robot fingerprint interface 400B may include a fingerprint reader area 465 configured to receive the physical robot fingerprint, which in the depicted example is a microstamp. The microstamp in the fingerprint reader 465 may include various fields, such as a time/date field 445, vendor ID field 450, device ID field 455, and tool ID field 460. It should be noted that the configuration of the physical fingerprint reader area 400B is schematically illustrated in FIG. 4B, and that a variety of other configurations are possible in accordance with various embodiments.

In various embodiments, the fingerprint reader 465 may be located on a dedicated area of the machine being serviced, and configured to receive a physical robot fingerprint, such as, without limitation, an area dedicated to receiving a microstamp of the robot fingerprint, an area dedicated to receiving an engraving of the robot fingerprint, a touch-sensitive surface (e.g., capacitive, resistive, acoustic, dispersive), an electrically conductive surface, an electronic paper (e-paper) surface or display operatively coupled to a touch-sensor, or other device that is responsive to physical contact to receive the robot fingerprint.

Accordingly, physical fingerprints may include a microstamp that may be transmitted via mechanical pressure, such as the pressing of a microstamp against the fingerprint reader area 465. In other embodiments, the physical fingerprint may be imparted via an engraver, such as a laser engraver or mechanical engraver. In some embodiments, physical contact may impart a robot fingerprint on a touch-sensitive surface of the machine being serviced, in which the robot fingerprint may be identified by timestamp. In some further embodiments, the various types of robot fingerprints may be combined to uniquely identify the device performing the service, and to determine changes caused and repairs effected by the device performing the service.

In various embodiments, the fingerprint reader 465 illustrates an example of the type of information that may be imparted by one example of a physical robot fingerprint on a machine being serviced. As previously described with respect to FIG. 4A, the physical fingerprint may include a time and date field 445, vendor ID field 450, device ID field 455, and tool ID field 460.

For example, in various embodiments, the time and date field 445 may indicate a time and a date on which a service was performed, a robot fingerprint was read, or contact was made between a device performing a service and machine being serviced. The time and date field 445, in some embodiments, may include a numeric or alphanumeric code. In some embodiments, the time and date may be updated or synchronized to a current time and date via the physical fingerprint interface of the device performing the service. For example, in some embodiments, where a microstamp is utilized, the physical fingerprint interface, configured to impart the microstamp, may be pre-configured to indicate a scheduled time and date of a service to be performed. In other embodiments where an engraver is utilized, the engraver may be configured to create the time and date field 445 utilizing current information, as controlled via the fingerprint control logic.

The vendor ID field 450 may indicate a vendor associated with the robot fingerprint. The vendor ID may be registered to a specific vendor via a global database, such as a remote fingerprint DB previously described. In some embodiments, vendor ID may be associated with the device performing the service, such as a service robot, remote device, the tool used to perform the service, such as a software tool or physical tool, or alternatively, identify the vendor responsible for performing the service. In some embodiments, the vendor ID displayed in the vendor ID field 450 may be a code of alphanumeric and/or non-alphanumeric characters associated with a specific vendor. In some further embodiments, the vendor ID displayed in the vendor ID field 450 may indicate a name of the vendor, such as the name of an individual, commercial entity, internal group, or other organization.

The device ID field 455 may indicate a specific device performing the service, such as a service robot or remote device. As described previously, in some embodiments, the device ID may be a code of alphanumeric and/or non-alphanumeric characters associated with the specific device performing the service. Accordingly, the device ID field 455 may display the code associated with the device performing the service, or otherwise identify the specific device associated with the service being performed.

The tool ID field 460 may indicate the specific tool used to perform the service. As previously described, the tool may be a physical tool, or a software tool. Accordingly, the tool ID may be a code of alphanumeric and/or non-alphanumeric characters associated with the tool used to perform the service. Accordingly, the tool ID field 460 may display the code associated with the tool used to perform the service. In some embodiments, the tool ID field 460 may display multiple codes associated with one or more tools that were used to perform the service.

FIG. 4C is a schematic illustration of an alternative graphical robot fingerprint output 400C. In various embodiments, the graphical fingerprint output 400C may include graphical representation of a machine being serviced, in this example a server 465. The graphical fingerprint output 400C may further include a graphical representation of various physical touches, detected by the one or more fingerprint readers, or by a touch sensitive surface or device of the server 465. For example, a first set of touches 470 may include first touch 470A, second touch 470B, third touch 470C, and fourth touch 470D. The first set of touches 470 may be associated with a first robot fingerprint. Accordingly, the first set of touches 470 may be depicted visually that differentiates those touches from other sets of touches associated with other robot fingerprints, in this example by a cross-hatching pattern. A second set of touches 475 may include a first touch 475A, second touch 475B, and third touch 475C. The second set of touches 475 may be associated with a second robot fingerprint. The second set of touches 475 may be visually differentiated by a solid black marking. A third set of touches 480 may include a first touch 480A, second touch 480B, third touch 480C, and fourth touch 480D. The third set of touches 480 may be associated with a third robot fingerprint. The third set of touches 480 may be visually differentiated by a diagonal hatching pattern. It should be noted that the configuration of the graphical robot fingerprint output 400C is schematically illustrated in FIG. 4C, and that a variety of other configurations are possible in accordance with various embodiments.

As described with respect to previous embodiments, the server 465 may include one or more types of robot fingerprint readers. The one or more robot fingerprint readers may include an electronic skin that displays the touches on the electronic skin. For example, electronic skin may include an e-paper display covering all or part of the surfaces of the machine being serviced. The e-paper display may be operatively coupled to a touch sensor, associating detected touches with corresponding locations on the electronic skin. In other embodiments, modifications, repairs, and other changes may be detected via various components of the server 465, including the one or more robot fingerprint readers. This information may be used to generate various touches on the graphical representation of the server 645. In some embodiments, the graphical representation of the server 645 and the various touches may be displayed remotely on a separate display device, while in other embodiments, the server 465 may itself further include a display device configured to display the graphical representation of the server 465 and the various touches. In yet further embodiments, the graphical representation of the server 645 and the various touches may be generated based on a scheduled service, type of service, detected changes, or anticipated changes. In some examples, information regarding the scheduled service, type or service, detected changes, or anticipated changes may be determined based on a robot fingerprint, in contrast with physical contact. In some embodiments, such information may be determined and/or obtained from a global fingerprint DB.

In the various embodiments described above, the touches may be differentiated graphically, based on the robot fingerprint associated with the touches. For example, in some embodiments, the first set of touches 470 may correspond to a first robot fingerprint associated with a first tool. Accordingly, the first tool may be associated with each of the first touch 470A, second touch 470B, third touch 470C, and fourth touch 470D. For example, in some embodiments the first tool may be a screwdriver. Accordingly, the touches 470A-470D may correspond to the locations of screws and the detected touches at the respective locations. The touches associated with the first robot fingerprint may be depicted by a cross-hatching pattern in the graphical fingerprint output 400C. The second set of touches 475 may correspond to a second robot fingerprint associated with a second tool. The second tool may, for example, be a robotic clamp. Accordingly, first touch 475A, second touch 475B, and third touch 475C of the second set of touches 475 may correspond to detected contact by the robot clamp with the chassis of the server 465. The touches associated with the second robot fingerprint may be depicted by a solid black marking. The third set of touches 480 may be associated with a third robot fingerprint of a third tool. In this example, the third tool may be a robotic clamp used to connect and/or disconnect various connections to and from the server 465. Accordingly, the first touch 480A, second touch 480B, third touch 480C, and fourth touch 480D of the third set of touches 480 may correspond to the locations of various ports of the server 465. Accordingly, the touches 480A-480D may correspond to the detected touches at the respective locations of the ports, and depicted in the graphical robot fingerprint output 400C as a diagonal hatching pattern.

In various embodiments, the first set of touches 470, second set of touches 475, and third set of touches 480, may be associated with individual robot fingerprints, sets or subsets of robot fingerprints associated with specific jobs, service orders, vendors, service robots, or tools.

Figure 5:
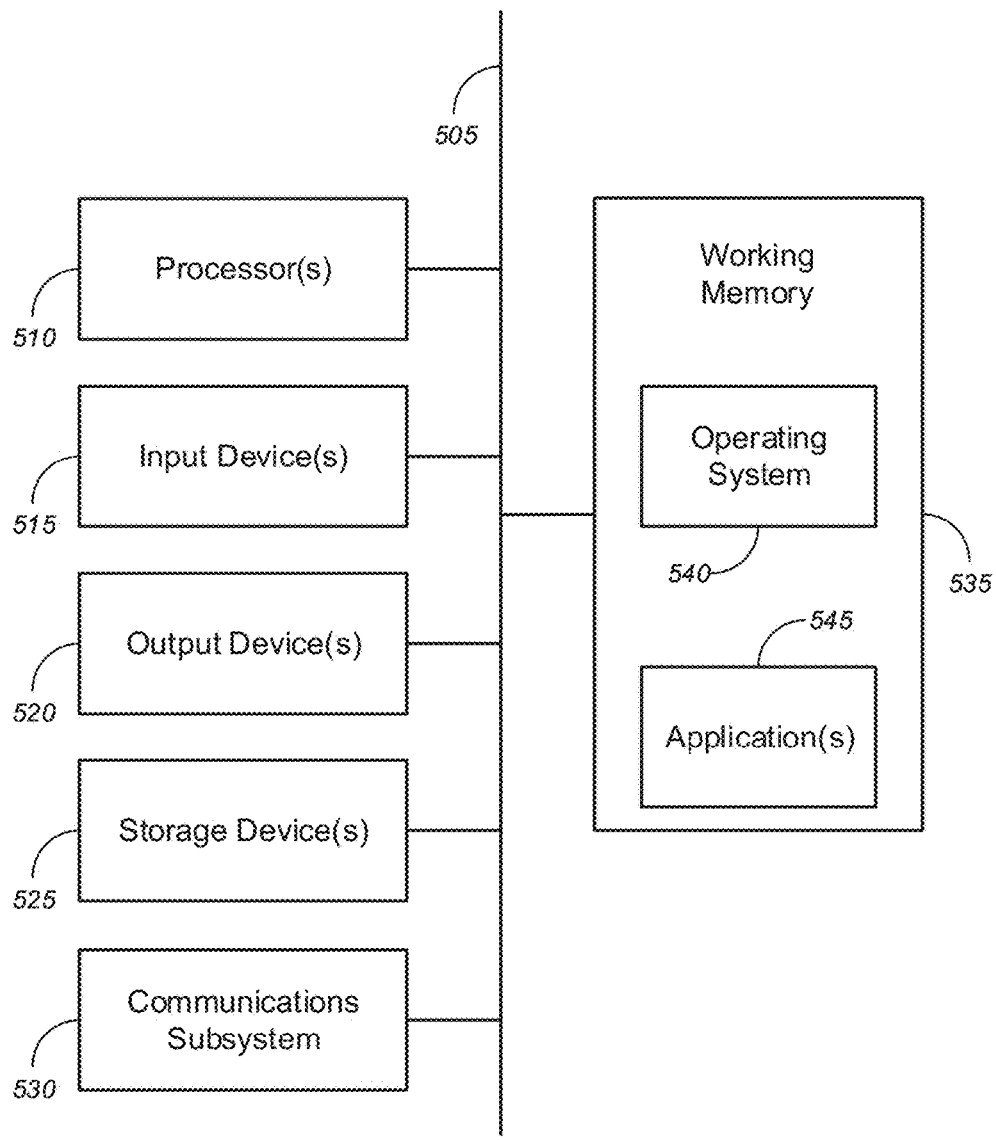
FIG. 5 is a schematic block diagram of a computer system for robot fingerprint service tracking, in accordance with various embodiments.

FIG. 5 is a schematic block diagram of a computer system 500 for robot fingerprint service tracking, in accordance with various embodiments. FIG. 5 provides a schematic illustration of one embodiment of a computer system 500 of a machine being serviced, or a device performing the service, which can perform the methods provided by various other embodiments, as described herein. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500—which represents an embodiment of the device performing a service, or a machine being serviced, described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, one or more robot fingerprint readers, a fingerprint reader interface, a mouse, a keyboard, and/or the like; and one or more output devices 520, which can include, without limitation, a display device, a graphical robot fingerprint output, a fingerprint interface, a robot fingerprint itself, and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 500 might also include a communications subsystem 530, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer system 500 further comprises a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments (including, without limitation, service control logic, and fingerprint control logic), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally receives the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

Figure 6:
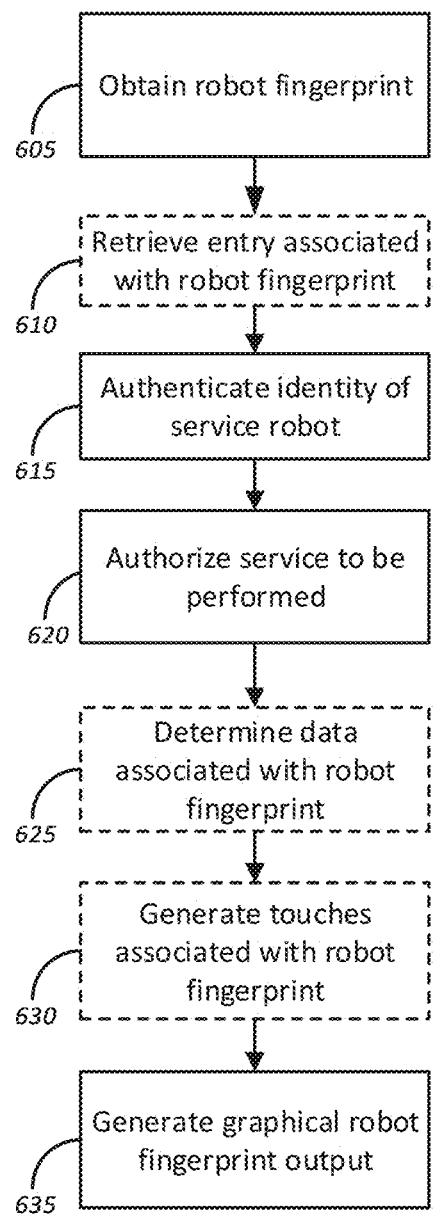
FIG. 6 is a flow diagram of a method for robot fingerprint service tracking, in accordance with various embodiments.

FIG. 6 is a flow diagram of a method 600 for robot fingerprint service tracking, in accordance with various embodiments. The method 600 begins, at block 605, by obtaining a robot fingerprint associated with a service robot. As previously described, the robot fingerprint may be obtained by a machine being serviced via a robot fingerprint reader. The robot fingerprint reader may include a reader interface through which the robot fingerprint may be obtained. Similarly, the device performing the service, in this case a service robot, may include a fingerprint interface for allowing the robot fingerprint to be obtained.

At optional block 610, the method 600 continues by retrieving an entry associated with the robot fingerprint from a robot fingerprint database. As previously described, in various embodiments, a robot fingerprint database may include a plurality of entries respectively associated one or more robot fingerprints. In some embodiments, the machine being serviced may be configured to access the robot fingerprint database to obtain, read, or retrieve information about the robot fingerprint stored on the robot fingerprint database. This information may then be used to help perform other functions, as will be described below.

At block 615, the method 600 continues by authenticating the identity of the service robot. In various embodiments, this may include use of the information retrieved from the robot fingerprint database, as previously described. The machine being serviced may authenticate the service robot based on the robot fingerprint obtained from the service robot. In some embodiments, this may include verifying the robot fingerprint against data in the robot fingerprint database.

At block 620, the method 600 continues by authorizing the service to be performed by the service robot. In various embodiments, this may be based on the authentication of the service robot, as well as verification of the services and/or types of services to be performed, as may be determined based on the robot fingerprint.

The method 600 continues, at optional block 625, by determining further data associated with the robot fingerprint. As previously described, in some embodiments, this may include retrieving one or more entries from the robot fingerprint database associated with the robot fingerprint. In some embodiments, the data associated with the robot fingerprint may include, without limitation, the service tool ID, device ID, vendor ID, service order information (e.g., the services or types of services to be performed), and other information associated with the robot fingerprint.

The method 600 continues, at optional block 630 by generating touches associated with the robot fingerprint. As previously described, the machine being serviced may include touch sensors and other touch sensitive devices. In some embodiments, the robot fingerprint reader may itself be touch sensitive. Accordingly, physical contact from the service robot or a service tool may be detected by the machine being serviced. Each instance of physical contact may be related to a robot fingerprint associated with the device or tool that caused the physical contact. Each of the physical contacts may be captured and generated as touches to be displayed on a graphical robot fingerprint output. The one or more touches may be sorted, differentiated, or grouped by robot fingerprint, service tool, service robot or other device, vendor, or service, or alternatively, by sets of robot fingerprints, tools, service robots, vendors, and/or services.

At block 635, the method 600 continues by generating a graphical robot fingerprint output. In various embodiments, the graphical robot fingerprint output may cause various information associated with the robot fingerprint to be displayed. For example, in some embodiments, the graphical robot fingerprint output may display information determined from the robot fingerprint, such as, without limitation, the time and date of the service, tool ID, device ID, vendor ID, service order information (e.g., the services or types of services to be performed), and other information associated with the robot fingerprint. In some embodiments, the graphical robot fingerprint output may further include a graphical representation of the machine being serviced and various touches. The graphical robot fingerprint output may be displayed remotely on a separate display device, while in other embodiments, the machine being serviced may itself further include a display device configured to display the graphical robot fingerprint output. In yet further embodiments, the graphical robot fingerprint output may be generated based on a scheduled service, type of service, detected changes, or anticipated changes, as determined based on the robot fingerprint.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a robot fingerprint reader associated with a machine receiving service, the robot fingerprint reader configured to receive a robot fingerprint;
   a service tool associated with the device performing the service, the service tool comprising an interface configured to allow the robot fingerprint of the device performing the service to be obtained;
   a robot fingerprint database comprising a plurality of entries, each of the entries associated with a respective robot fingerprint;
   wherein the robot fingerprint reader is configured to obtain, via the interface of the service tool, the robot fingerprint of the device performing the service;
   wherein the service robot is configured to register, with the robot fingerprint database, the robot fingerprint of the device performing the service; and
   wherein the robot fingerprint database is configured to create an entry associated with the robot fingerprint of the device performing the service.

2. The system of claim 1, wherein the robot fingerprint is an encoded identifier, wherein the interface is further configured to transmit the robot fingerprint to the reader.

3. The system of claim 1, wherein the robot fingerprint is a physical robot fingerprint, wherein the service tool is configured to impart the physical robot fingerprint through physical contact, via the interface, with the robot fingerprint reader, and wherein the robot fingerprint reader is configured to receive the physical robot fingerprint through physical contact via the interface.

4. The system of claim 2, wherein the interface includes one of a microstamp, engraver, speaker, or electrically conductive surface, and wherein the robot fingerprint reader includes one of a microphone, electrically conductive surface, or a surface configured to receive the microstamp or engraver.

5. The system of claim 1, wherein the robot fingerprint is an optical robot fingerprint including one of a barcode, alphanumeric characters, symbols, images, or an optical signal, wherein the interface is configured to display or transmit the optical robot fingerprint, and wherein the robot fingerprint reader is configured to capture the optical robot fingerprint.

6. The system of claim 1, wherein the robot fingerprint is an encoded identifier, wherein the interface is configured to allow the robot fingerprint to be read wirelessly.

7. The system of claim 6, wherein the interface includes one of a radio frequency identification tag, near field communication chip, or a radio frequency transceiver.

8. The system of claim 1, wherein the service tool is a software tool, wherein the software tool includes the robot fingerprint as part of its code, wherein the interface includes a software interface for accessing the robot fingerprint.

9. The system of claim 1, wherein the robot fingerprint database is configured to maintain metadata associated with the robot fingerprint in the entry associated with the robot fingerprint, wherein the metadata identifies at least one of a vendor responsible for the device performing the service, the device performing the service, or the service tool used to perform the service.

10. The system of claim 1 further comprising fingerprint control logic coupled to the robot fingerprint reader, wherein the fingerprint control logic is further communicatively coupled to the robot fingerprint database, the fingerprint control logic configured to receive the robot fingerprint from the robot fingerprint reader, authenticate the device performing the service based, at least in part, on the entry associated with the robot fingerprint in the fingerprint database, and authorize the service to be performed based, at least in part, on the entry associated with the robot fingerprint in the fingerprint database.

11. The system of claim 1, wherein the robot fingerprint database is a local database stored on the machine receiving the service.

12. The system of claim 1 further comprising a graphical robot fingerprint output configured to cause to be displayed one of a robot fingerprint, touches associated with physical contact from the service tool or the device performing the service, or information associated with the robot fingerprint based at least in part on the entry associated with the robot fingerprint.

13. An apparatus comprising:
    a robot fingerprint reader configured to receive a robot fingerprint;
    a processor communicatively coupled to the robot fingerprint reader;
    a non-transitory computer readable medium comprising instructions executable by the processor to:
       obtain a robot fingerprint, via the robot fingerprint reader, from an interface of a service tool associated with a service robot;
       authenticating, based on the robot fingerprint, an identity of the service robot;
       authorizing, based on the robot fingerprint, a service to be performed by the service robot; and
       generating a graphical robot fingerprint output based, at least in part, on the robot fingerprint.

14. The apparatus of claim 13, wherein the non-transitory computer readable medium further comprises instructions executable by the processor to:
    retrieve, from a robot fingerprint database, an entry associated with the robot fingerprint;
    determining, based on the entry, data associated with the service robot including at least one of a vendor associated with the service robot, or the service tool used to perform the service.

15. The apparatus of claim 13, wherein the non-transitory computer readable medium further comprises instructions executable by the processor to:
    display, via the graphical robot fingerprint output, data associated with the service robot, including at least one of a time and date associated with the service, a vendor associated with the service robot, the service tool used to perform the service, or information about the type of service to be performed.

16. The apparatus of claim 13, wherein the non-transitory computer readable medium further comprises instructions executable by the processor to:
    detect physical contact associated with the robot fingerprint including the service tool and service robot;
    generate one or more touches associated with the robot fingerprint, wherein each of the one or more touches corresponds to a respective instance of physical contact associated with the robot fingerprint; and
    render the one or more touches as part of the graphical robot fingerprint output.

17. The apparatus of claim 16, wherein the apparatus further comprises an electronic skin in communication with the fingerprint reader, wherein the fingerprint reader is a touch sensitive device, and wherein the electronic skin is configured to display the graphical robot fingerprint output, wherein the non-transitory computer readable medium further comprises instructions executable by the processor to:
   determine, for each of the one or more touches, a location on the electronic skin relative to where the respective instance of physical contact associated with the robot fingerprint occurred; and
   render, on the electronic skin, the one or more touches at the location on the electronic skin where the respective instance of physical contact associated with the robot fingerprint was determined to have occurred.

18. A method comprising:
   obtaining, via a robot fingerprint reader, a robot fingerprint from an interface of a service tool associated with a service robot;
   authenticating, via a robot fingerprint database, an identity of the service robot;
   authorizing, based on the robot fingerprint, a service to be performed by the service robot; and
   generating a graphical robot fingerprint output based, at least in part, on the robot fingerprint.

19. The method of claim 18 further comprising:
   retrieving, from the robot fingerprint database, an entry associated with the robot fingerprint; and
   determining, based on the entry, data associated with the robot fingerprint including at least one of a time and date associated with the service to be performed, a vendor associated with the service robot, the service tool used to perform the service, or information about the type of service to be performed; and
   displaying the data associated with the robot fingerprint as part of the graphical robot fingerprint output.

20. The method of claim 18 further comprising:
   detecting, via the robot fingerprint reader, physical contact associated with the robot fingerprint;
   generating one or more touches associated with the robot fingerprint, wherein each of the one or more touches corresponds to a respective instance of physical contact associated with the robot fingerprint; and
   rendering the one or more touches as part of the graphical robot fingerprint output.

* * * * *